United States Patent

Corley

[11] Patent Number: 4,773,179
[45] Date of Patent: Sep. 27, 1988

[54] FISHING ROD ATTACHMENT FOR ARCHERY

[76] Inventor: Wilbur E. Corley, 727 Holiday La., Claremore, Okla. 74017

[21] Appl. No.: 8,670

[22] Filed: Jan. 30, 1987

[51] Int. Cl.$^4$ ............................................. A01K 91/02
[52] U.S. Cl. ........................................ 43/19; 43/18.1; 124/86; 403/109; 403/166
[58] Field of Search ...................... 43/19, 18.1; 124/86; 403/101, 102, 109, 166

[56] References Cited

U.S. PATENT DOCUMENTS

| | | | |
|---|---|---|---|
| 1,029,967 | 6/1912 | Bolin | 403/102 |
| 1,036,222 | 8/1912 | Griffenberg | 403/102 |
| 3,036,398 | 5/1962 | Gagner | 43/18.1 |
| 3,129,525 | 4/1964 | Lewis | 43/19 |
| 3,165,855 | 1/1965 | Stephenson | 43/19 |
| 3,314,186 | 4/1967 | Viveiros | 43/19 |
| 3,355,836 | 12/1967 | Hanson | 43/19 |
| 3,754,346 | 8/1973 | Worsham | 43/19 |

FOREIGN PATENT DOCUMENTS 1279188  6/1972  United Kingdom ............... 403/109

*Primary Examiner*—Gene P. Crosby
*Attorney, Agent, or Firm*—Robert B. Stevenson

[57] ABSTRACT

A fishing rod which is foldable is pivotally attached at one end to the handle of a bow. The fishing line from a reel is attached to the arrow which is to be shot and extends through the eyelet of the fishing rod to the fishing reel. The fishing rod is folded to about half its length and is rotated about the pivot point down out of the way so as not to hamper the normal shooting of the arrow. When the arrow strikes a fish, the fishing pole is unfolded and rotated to its operating position by triggering a lever. The fishing reel and rod can then be used to reel in the fish.

7 Claims, 3 Drawing Sheets

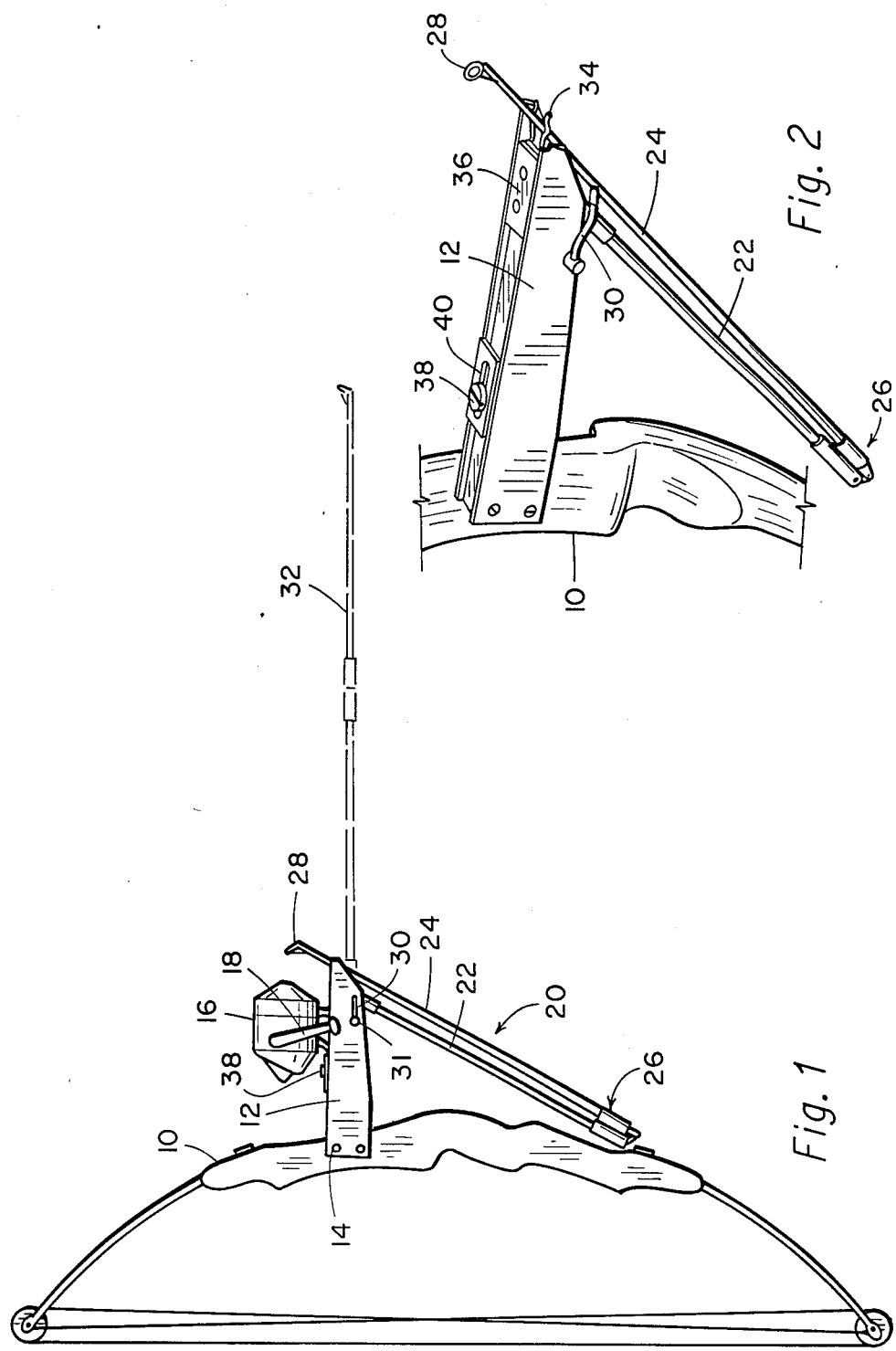

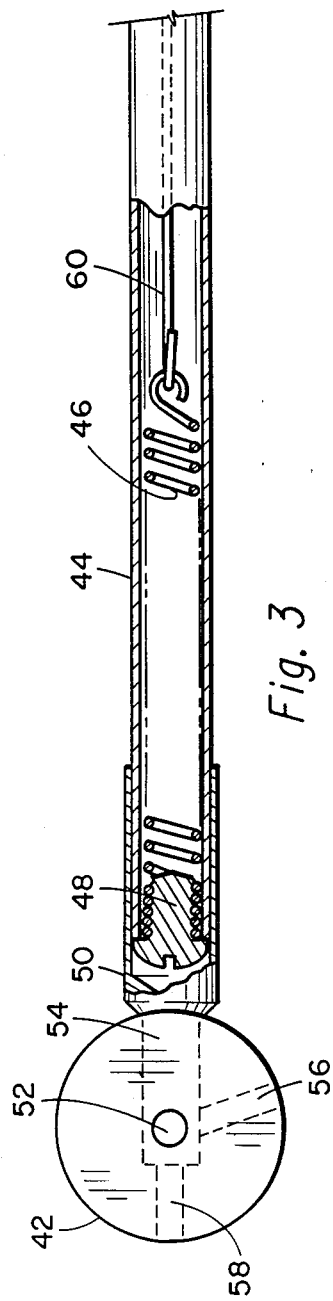
Fig. 3
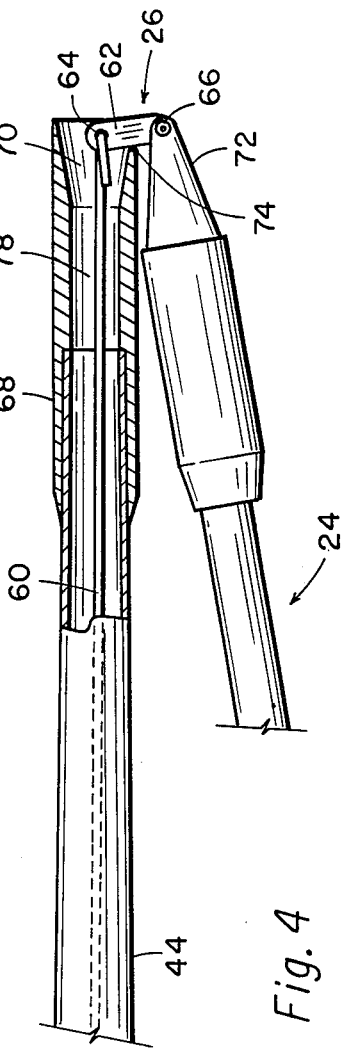
Fig. 4
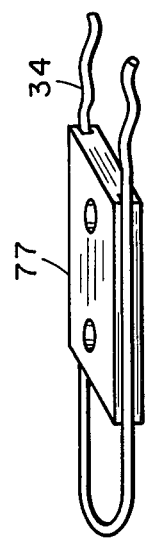
Fig. 7
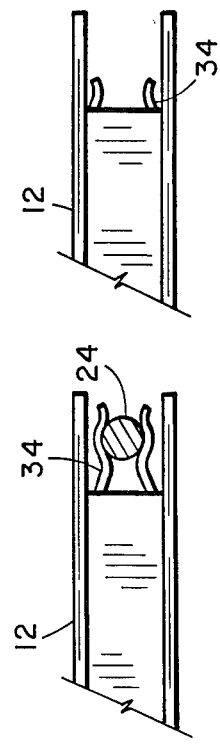
Fig. 6
Fig. 5

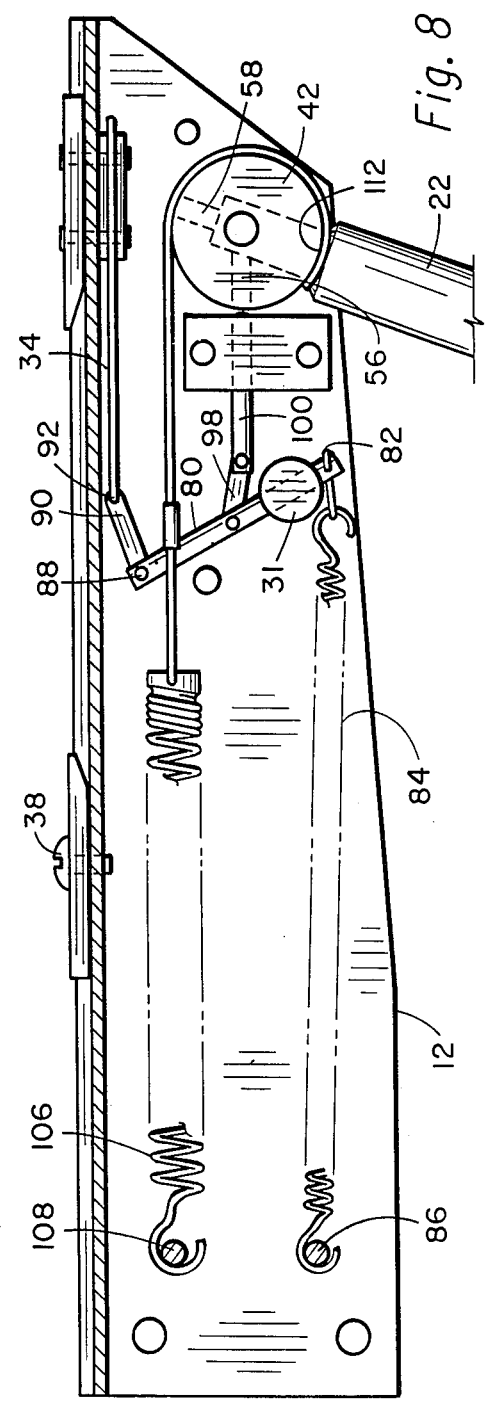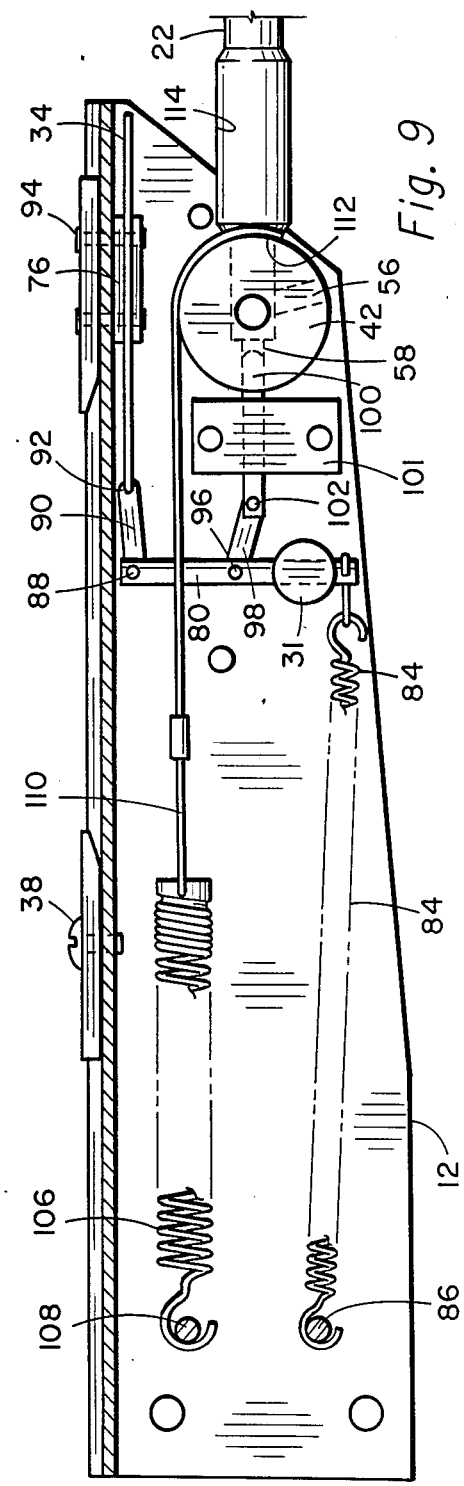

FISHING ROD ATTACHMENT FOR ARCHERY

BACKGROUND OF THE INVENTION

This invention relates to fishing with a bow and arrow.

It is well known to use a rod and fishing reel to fish. The line is unwound from the reel through an eyelet at the end of a fishing rod as the lure at the end of the line is cast into the water. The lure and fish if one is caught is retrieved by rewinding the line with the reel.

Another method of fishing is to use a bow and arrow whereby the fishing line from the reel is attached to the arrow and is shot toward a fish with the hopes of catching a fish. The line can then be retrieved by a conventional reel which is attached to the bow.

SUMMARY OF THE INVENTION

This is an extendible-folding fishing rod for use with a bow and arrow and reel with fishing line in bow fishing. The foldable rod and releasing and clamping mechanism is held in a base which is attachable to a bow. The control means includes a control lever and locking pin supported by the base and a pivot drum having a first and a second outwardly opening radial cavity. One end of the rod is attached to the pivot drum. There is a drum biasing means to bias the rod to its normal position with respect to the reel. When the locking pin is in the first cavity the rod is held in a position where it extends out from the base back toward the bow where it is out of the way. When the rod is released from its retracted position by removing the locking pin the drum rotates automatically extending the rod outwardly in a straight line in the normal relationship with a reel which is attached to the base.

The rod is composed of a first section and a second section with a special connection at the center portion so that the rod may fold into approximately half its length. Second or rod biasing means is provided to bias the rod into a straight unfolded position. This restraint is overcome when the rod is folded. A clamp holds the rod in the folded position and thus restrains the rod biasing means. The restraint on this biasing means is relieved by the same lever movement which releases the restraint on the biasing means. Thus, with one movement of the control lever the rod is rotated about its positioning drum to its normal position and the restraint on the second biasing means is released and the rod is extended to its straight or unfolded position.

DESCRIPTION OF THE DRAWINGS

FIG. 1 shows my folded, retractible rod attached to a base attached to a bow.

FIG. 2 is an enlarged perspective showing the folded rod, the base and a portion of the bow of FIG. 1.

FIG. 3 illustrates, partially in section, the base section of my foldable rod together with the pivot drum.

FIG. 4 illustrates the pivotal connection between the two sections of my foldable rod.

FIG. 5 illustrates the releasable spring clamp for holding my rod in its collapsed position.

FIG. 6 is similar to FIG. 5, except the releasable spring clamp is in the released position with the rod released.

FIG. 7 shows the guide for the releasable clamp of FIGS. 5 and 6.

FIG. 8 illustrates partly in section the means for holding a rod in a selected rotational position and the releasable rod spring clamp in position.

FIG. 9 is similar to FIG. 8 except that the control lever is in a second radial cavity within the rod pivot drum to hold a rod in a selected position and also shows the releasable rod clamp in and extended locked position.

DETAILED DESCRIPTION OF THE PREFERRED EMBODIMENT

Attention is first directed to FIGS. 1 and 2. Shown thereon is a bow 10. A compound bow is shown but any suitable bow could be used. A base 12 is attached to the handle portion of the bow by suitable screws or bolts 14. Mounted on the base 12 is a reel 16 which can be any conventional reel operated by handle 18. A collapsed rod 20 has a base section or inner arm 22 and an extension or outer arm 24 connected by pivoting joint 26 with eyelet 28 at the end of arm 24. The rod is shown in its folded and retracted position. When in this position it is seen that the rod is essentially out of the way and will not cause any confusion when the bow is used to shoot an arrow. A fishing line, not shown, extends from the reel through eyelet 28 and is connected to an arrow, not shown, which is to be shot by the bow. Rod 20 is held in the position shown in FIG. 1 by means more fully shown in FIGS. 8 and 9. However, it can be said that when the lever 30 is in one radial cavity of a pivot drum which is attached to base section 22, it is held in that position until the drum is released by movement of the lever 30. As will be more fully described this releases biasing means to cause the pivot drum to rotate within base 12 and the rod to go to its extended position as indicated by the dotted lines 32.

FIG. 2 is a perspective showing an enlarged portion of the base with reel removed and only a portion of the bow handle shown. It shows a releasable clamp 34 and clamp guide 36 which is within the base 12. Also shown is a securing bolt 38 and bar 40 for securing the reel 16 to the base 12.

Attention is next directed to FIGS. 3 and 4 to show the mechanism of the "foldable" rod. There is shown a rod with pivot drum 42 and pivot section 26. The inner arm has a housing 44 in which is mounted a spring 46 which is secured by bolt 48 to the end of housing 44 opposite pivot section 26. Housing 44 can be secured to the inside of an enlarged cylindrical housing 50 such that housing 44 is fixed to housing 50. Housing 50 is connected to a pivot drum 40 by a pin 52 through cylindrical extension member 54. Pivot drum 42 has two radial cavities. A first cavity 56 and a second cavity 58. A stiff wire rod 60 is connected to the end of spring 46. As shown in FIG. 4, the other end of rod 60 is connected to a pivot bar 62 which has a hole 64 in one end and a hole 66 in the other end. Housing 44 is secured to a larger diameter housing section 68 in any acceptable manner. The outer end of housing section 68 is provided with a conical shaped recess 70. The outer arm 40 is provided with a conical section 72 which is of a size to fit snugly into conical shaped recess 70 of housing section 68. The bar 62 is connected at pivot 66 to conical section 72. The rod 60 is connected to pivot bar 62 at hole 64. The end of housing section 68 is provided with a slot 74 into which bar 62 can fit. It is thus seen that spring 46 applies a biasing force on rod 60 to pull pivot bar 62 along the center or internal part of housing 44. This force causes the bar 62 to pivot about the slot 74.

Continued force causes a bar 62 to become completely in the interior 78. This causes the outer arm 64 to pivot about pivot point 66 and with continued movement caused by the biasing movement of spring 46 the conical section or plug 72 is pulled into the conical shaped recess 70 so that the outer arm 24 and the inner arm 22 are aligned. The continued biasing force on rod 60 holds the conical section 72 within recess 70 so that the extended rod or unfolded rod becomes in effect a fishing rod having normal characteristics. This is a novel connection.

Attention is next directed to FIG. 8 to show the mechanism for applying a biasing means to pivot drums 42 and means to force the releasable clamp 34 into its extended position where it can clamp outer arm 24 and hold it so that the rod is held in a folded position. Shown thereon is a pivot drum 42 attached to inner arm 22 of rod 20. When in the position shown rod 20 will be in the rotated position as shown in FIGS. 1 and 2. The control lever handle 30 is connected to a lever pin 31. Extending through a hole in pin 31 is a lateral pin 80. At one end of pin 80 there is a hole 82 through which one end of a tension spring 84 is connected. The other end of the spring 84 is connected to a pin 86 at the other end of the base 12. In lateral pin 80, at the end opposite hole 82 is a second pivot point 88 to which a bar 90 is attached. Bar 90 has a hole 92 to which wire clamp 34 extends. As shown more clearly in FIG. 7, wire clamp 34 is provided with a guide 77 which is held to the base by bolts 94 in any suitable manner.

The midpoint 96 of pin 80 is pivotally connected to a short bar 98. The short bar 98 is connected to a locking pin 100 by pivot 102. Locking pin 100 slidingly extends through guide block 101.

Spring 84 exerts a biasing force through linkage including lateral pin 80 against clamp 34 urging the clamp 34 into the extended position shown in FIG. 9. In FIG. 8, the position of the components is such that locking pin 100 has just been removed from cavity 56 of drum 42 but the rod arm 22 has not yet rotated. When locking pin 100 is in the position of FIG. 9, the clamp 34 is in the locking position shown in FIG. 5. When in the position of FIG. 8, it assumes the position of FIG. 6 which is in a released position. When it is desired to have the releasable rod spring clamp 34 in a clamped position, the outer arm 24 will be in the position shown in FIG. 5 and will be locked inasmuch as the spring 84 forces it to stay in that position. It will stay in that position until the lever 30 is moved.

Attention will now be directed toward that part of FIGS. 8 and 9 which show means for biasing pivot drum 42 counterclockwise when looking at FIG. 8 so that the rod 22 will assume the position shown in FIG. 9. This includes a spring 106 connected at one line to a pin 108 secured to the housing of base 12. The other end of spring 106 is connected to a line 110 which extends around the periphery of drum 42 where it is secured to the periphery at point 112. Thus, tension on the spring 106 is constantly urging the drum 42 to the position shown in FIG. 9. There is an abuttment or shoulder 114 on the end of housing 12 which stops the movement of the end of arm 22 and thus stops the rotation of drum 42.

In operation or use of the device of this invention, it is seem that the base 12 is mounted on the box 10. A fishing line is connected from the reel 16 through eyelet 28 of the rod and then to an arrow is attached to the end of the line. The rod 20 is folded to the position shown in FIG. 1. This is accomplished by releasing locking pin 100 from drum 42 which will be the position shown in FIG. 8. Then the arm 22 is manually rotated so that the pivot drum 42 is rotated into the position shown in FIGS. 1, 2 and 8. Then, the rod itself is folded about joint 26 and the end of arm 24 is fitted into the releasable spring clamp 34 as shown especially clear in FIG. 5. This locking of rod 24 shown in FIG. 5 is accomplished by rotating lever 31 so that locking pin 100 enters cavity 56. When in this position the locking pin 100 prevents the drum 42 from rotating. Inasmuch as the pin is now in the position shown in FIG. 9, except having entered cavity 56 instead of 58 the clamps 34 are in their extended position as shown in FIG. 5. Thus, as this stage the pivot drum 42 is in the position to hold the rod 20 in the retracted position shown in FIG. 1 and the clamp 34 holds the spring 34 in the position shown in FIG. 5. This is the position which the device will be in at the time the fisherman shoots the arrow. If the arrow strikes the fish or something which the fisherman wishes to retrieve, he merely moves lever 30 so that two things happen. One, locking pin 100 is removed from cavity 56 to the position shown in FIG. 8 which permits drum 42 to rotate and second simultaneously the clamp 34 is moved to its released position as shown in FIG. 8 and in FIG. 6. This immediately permits the rod to go to its extended position as shown by dotted line 32 in FIG. 1. The force for this is derived from spring 46 shown in FIG. 3. Until it was released, releasable rod spring clamp 34 prevented the spring 46 from causing the conical section 22 of outer arm 24 to be drawn into the conical shaped recess 70. But once the releasable clamp 34 is released, spring 46 causes the conical section 72 to be pulled into conical shaped recess 70 so that rod 24 is a straight stable rod. Thus, by one movement of lever 30 pivot drum 42 is released and the spring 106 causes it to rotate to the position shown in the dotted line of FIG. 1. At the same time, by the same movement of lever 30, the clamping spring 34 is drawn to the position shown in FIG. 8 and FIG. 6 so that the outer arm 24 of the rod is released. Nearly instantaneous with the moving of the lever then the rod 20 is rotated and extended into the position shown by the dotted line 32 in FIG. 1. Then the rod and reel can be used substantially as a conventional rod and reel.

When it is desired to return the rod to the position shown in FIG. 1, locking pin 100 is removed from the cavity 58 by rotation of locking pin 31, then the arm 22 is rotated until it reaches the position of FIG. 8. At this time, the pin 100 enters cavity 56. Also, the rod is then folded at connection 26 and the end of outer arm 24 is secured in spring clamp 34.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An extendible fishing rod for use with a bow and arrow and reel with a fishing line for use in bow fishing which comprises:
   a base attachable to said bow;
   a rod having an inner arm and an outer arm with a connector means therebetween such that said arms can be held in a straight position or in a folded position with respect to each other;

pivot means connecting the inner arm to said base;

biasing means urging said inner arm to rotate in a selected direction about said pivot means;

locking means supported by said base to secure the end of said outer arm in a folded position.

2. An extendible fishing rod as defined in claim 1 in which said connector means includes a conical shaped recess in the outer end of said inner arm, a conical shaped plug on the inner end of said outer arm and adapted to fit firmly into said conical shaped recess, a slot in the wall of said conical recess;

a biasing means within said inner arm, a rod connecting at one end to said biasing means, a pivot bar adapted to fit into said slot, one end of said pivot bar connected to an end of said rod and the other end of said pivot bar connected to the apex of the conical plug.

3. A base for use with a foldable fishing rod having an inner arm and an outer arm for use with a bow and reel and fishing line in bow fishing;

a housing;

a pivot drum mounted in one end of said housing, said drum having a first and a second radial cavity extending out the peripheral edge thereof;

a locking pin;

a guide having a cavity through which said locking pin extends;

first means to force said locking pin through said cavity into a selected radial cavity of said pivot drum;

a releasable locking clamp which in one position extends beyond the end of said housing;

connecting means connected to said first means whereby insertion of said locking pin into said first radial cavity extends said locking clamp out of said housing;

pivot drum biasing means which includes a spring and a line extending over said pivot drum and attached thereto.

4. A base as defined in claim 3 in which said connecting means includes a lateral pin having a first end and a second end and a middle, a tension spring attached to said first end of said lateral pin;

a clamp bar having a first end and a second end, said first end pivotally attached to the second end of said lateral pin and the second end attached to said locking clamp;

guide means for said locking clamp and suported by said housing;

said first means including a locking pin having a first end and a second end including means to pivotally connect the first end of said locking pin bar to the center point of said lateral pin and pivotal means to connect the second end of said locking pin bar to one end of said locking pin;

a lever having a lever pin extending into said housing and with a hole therethrough and into which said lateral pin extends.

5. A connector which comprises:

a first elongated member at least partially hollow and having a conical shaped recess in one end thereof defining a wall with a slot therein;

a second elongated member having a conical shaped end with a nose for fitting into said conical shaped recess;

biasing means within said first elongated member;

a bar having a first end and a second end and sized to fit into said slot;

pivot means connecting one end of said bar to said conical nose;

a rod connecting the other end of said bar to said biasing means.

6. A connector as defined in claim 5 in which said biasing means is a tension spring attached to the interior of said first elongated member.

7. A device for fishing which comprises:

a bow and arrow;

a housing attached to said bow;

a reel with a fishing line attached to said housing;

a pivot drum mounted in one end of said housing;

a rod attached to said pivot drum such that rotation of such drum rotates said rod between a first rotational position and a second rotational position;

biasing means biasing said drum towards said first position;

locking means to hold said pivot drum in said second position against said biasing means.

* * * * *